(12) United States Patent
Cronin

(10) Patent No.: US 11,272,039 B2
(45) Date of Patent: Mar. 8, 2022

(54) REAL TIME UNIFIED COMMUNICATIONS INTERACTION OF A PREDEFINED LOCATION IN A VIRTUAL REALITY LOCATION

(71) Applicant: SONY INTERACTIVE ENTERTAINMENT LLC, San Mateo, CA (US)

(72) Inventor: John Cronin, Williston, VT (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

(21) Appl. No.: 16/792,793

(22) Filed: Feb. 17, 2020

(65) Prior Publication Data

US 2020/0314214 A1 Oct. 1, 2020

Related U.S. Application Data

(63) Continuation of application No. 14/460,273, filed on Aug. 14, 2014, now Pat. No. 10,565,249, which is a continuation of application No. 14/147,430, filed on Jan. 3, 2014, now abandoned.

(Continued)

(51) Int. Cl.
*H04L 29/06* (2006.01)
*G06F 16/44* (2019.01)
(Continued)

(52) U.S. Cl.
CPC .......... *H04L 67/38* (2013.01); *A63F 13/352* (2014.09); *A63F 13/63* (2014.09); *A63F 13/65* (2014.09);
(Continued)

(58) Field of Classification Search
CPC ........ H04L 67/38; H04L 67/42; A63F 13/352; A63F 13/65; A63F 13/63; A63F 13/335;
(Continued)

(56) References Cited

U.S. PATENT DOCUMENTS 3,883,237 A  5/1975 Juergens
5,258,785 A  11/1993 Dawkins
(Continued)

FOREIGN PATENT DOCUMENTS

CN  102 566 756 A  7/2012
EP  2 378 781  10/2011
(Continued)

OTHER PUBLICATIONS

A Quality of Experience Model for Haptic Virtual Environments; Hamam et al., ACM Transaction on Multimedia Computing, Communications and Applications, vol. 10, No. 3, Article 28, pp. 1-23, Apr. 2014.

(Continued)

*Primary Examiner* — Aaron N Strange
(74) *Attorney, Agent, or Firm* — Polsinelli LLP

(57) ABSTRACT

A virtual reality network provides access to a number of virtual reality representations, each virtual reality representation representing a location in a virtual universe and defined by VR data stored on the network. The VR data can be in a simplified data format. A database stores the network address and the location in the universe of each virtual reality representation. A database server provides access to the database. The database server generates a list of locations in response to a location query from a visitor, and provides the network address of the virtual reality representation of a selected location. A visitor connects to the database server with a client host to visit the locations in the virtual universe.

22 Claims, 8 Drawing Sheets

Related U.S. Application Data

(60) Provisional application No. 61/786,569, filed on Mar. 15, 2013.

(51) Int. Cl.

| | | |
|---|---|---|
| *G06F 16/954* | (2019.01) | |
| *G06F 3/0481* | (2013.01) | |
| *A63F 13/352* | (2014.01) | |
| *A63F 13/63* | (2014.01) | |
| *A63F 13/65* | (2014.01) | |
| *G06F 16/16* | (2019.01) | |
| *H04L 67/131* | (2022.01) | |
| *H04L 67/01* | (2022.01) | |
| *G06F 3/04815* | (2022.01) | |
| *A63F 13/335* | (2014.01) | |
| *A63F 13/87* | (2014.01) | |

(52) U.S. Cl.
 CPC ........ *G06F 3/04815* (2013.01); *G06F 16/168* (2019.01); *G06F 16/444* (2019.01); *G06F 16/954* (2019.01); *H04L 67/42* (2013.01); *A63F 13/335* (2014.09); *A63F 13/87* (2014.09)

(58) Field of Classification Search
 CPC .... A63F 13/87; G06F 16/954; G06F 3/04815; G06F 16/168; G06F 16/444
 See application file for complete search history.

(56) References Cited

U.S. PATENT DOCUMENTS

| | | |
|---|---|---|
| 5,585,871 A | 12/1996 | Linden |
| 5,757,358 A | 5/1998 | Osga |
| 5,982,555 A | 11/1999 | Melville et al. |
| 6,084,979 A | 7/2000 | Kanade et al. |
| 6,151,060 A | 11/2000 | Tabata |
| 6,152,563 A | 11/2000 | Hutchinson et al. |
| 6,175,352 B1 | 1/2001 | Kay et al. |
| 6,184,847 B1 | 2/2001 | Fateh et al. |
| 6,282,362 B1 | 8/2001 | Murphy et al. |
| 6,315,273 B1 | 11/2001 | Davies |
| 6,345,129 B1 | 2/2002 | Aharon |
| 6,415,316 B1 | 7/2002 | Van Der Meer |
| 7,298,378 B1* | 11/2007 | Hagenbuch ........... G06F 16/444 345/589 |
| 7,667,700 B1* | 2/2010 | Neely, III ............... G06F 3/012 345/427 |
| 7,933,395 B1 | 4/2011 | Bailly et al. |
| 7,949,642 B2 | 5/2011 | Yang et al. |
| 7,970,240 B1 | 6/2011 | Chao et al. |
| 8,583,915 B1 | 11/2013 | Huang |
| 8,803,912 B1 | 8/2014 | Fouts |
| 9,007,301 B1 | 4/2015 | Raffle et al. |
| 9,043,325 B1 | 5/2015 | Moczydlowski |
| 9,096,920 B1 | 8/2015 | Gomez et al. |
| 9,213,185 B1 | 12/2015 | Stamer et al. |
| 9,240,014 B1* | 1/2016 | Hoffman ................ G06Q 30/02 |
| 9,254,438 B2 | 2/2016 | Finn et al. |
| 9,256,347 B2 | 2/2016 | Finn et al. |
| 9,261,959 B1 | 2/2016 | D'Amico et al. |
| 9,318,026 B2 | 4/2016 | Peters et al. |
| 9,329,682 B2 | 5/2016 | Keane et al. |
| 9,437,159 B2 | 9/2016 | Moravetz |
| 9,472,014 B2 | 10/2016 | Chan et al. |
| 9,521,368 B1 | 12/2016 | Cronin |
| 9,555,334 B2* | 1/2017 | Bernard ................ A63F 13/10 |
| 9,588,343 B2 | 3/2017 | Cronin |
| 9,669,296 B1* | 6/2017 | Hibbert ................ A63F 13/216 |
| 9,710,873 B1* | 7/2017 | Hill .......................... G06T 11/00 |
| 9,818,230 B2 | 11/2017 | Moravetz |
| 9,838,506 B1 | 12/2017 | Cronin |
| 9,986,207 B2 | 5/2018 | Cronin |
| 10,096,167 B2 | 10/2018 | Moravetz |
| 10,216,738 B1 | 2/2019 | Cronin |
| 10,320,946 B2 | 6/2019 | Cronin |
| 10,356,215 B1 | 7/2019 | Cronin |
| 10,401,958 B2 | 9/2019 | Peana et al. |
| 10,474,711 B1 | 11/2019 | Cronin |
| 10,565,249 B1 | 2/2020 | Cronin |
| 10,599,707 B1 | 3/2020 | Cronin |
| 10,809,798 B2 | 10/2020 | Moravetz |
| 10,938,958 B2 | 3/2021 | Cronin |
| 10,949,054 B1 | 3/2021 | Cronin |
| 11,036,292 B2 | 6/2021 | Moravetz |
| 11,064,050 B2 | 7/2021 | Cronin |
| 2002/0038456 A1 | 3/2002 | Hansen et al. |
| 2002/0083134 A1 | 6/2002 | Bauer et al. |
| 2004/0111332 A1 | 6/2004 | Baar et al. |
| 2004/0193441 A1 | 9/2004 | Altieri |
| 2005/0086612 A1 | 4/2005 | Gettman et al. |
| 2006/0026170 A1 | 2/2006 | Kreitler et al. |
| 2006/0028400 A1 | 2/2006 | Lapstun et al. |
| 2006/0236240 A1 | 10/2006 | Lebow |
| 2006/0242680 A1 | 10/2006 | Johnson et al. |
| 2007/0296646 A1 | 12/2007 | Yamamoto et al. |
| 2008/0024392 A1 | 1/2008 | Gustafsson et al. |
| 2008/0106489 A1 | 5/2008 | Brown et al. |
| 2008/0155019 A1 | 6/2008 | Wallace et al. |
| 2008/0221843 A1 | 9/2008 | Shenkar et al. |
| 2008/0306817 A1 | 12/2008 | Amidon et al. |
| 2009/0005961 A1 | 1/2009 | Grabowski et al. |
| 2009/0106672 A1 | 4/2009 | Burstrom |
| 2009/0112469 A1 | 4/2009 | Lapidot et al. |
| 2009/0113349 A1 | 4/2009 | Zohar et al. |
| 2009/0263777 A1 | 10/2009 | Kohn |
| 2009/0271436 A1 | 10/2009 | Reisinger |
| 2010/0017728 A1 | 1/2010 | Cho et al. |
| 2010/0026718 A1 | 2/2010 | Jetha et al. |
| 2010/0083169 A1 | 4/2010 | Athsani et al. |
| 2010/0088632 A1 | 4/2010 | Knowles et al. |
| 2010/0102476 A1 | 4/2010 | Higgins |
| 2010/0110069 A1 | 5/2010 | Yuan |
| 2010/0208029 A1 | 8/2010 | Marti et al. |
| 2010/0231706 A1 | 9/2010 | Maguire |
| 2010/0238161 A1 | 9/2010 | Varga et al. |
| 2010/0259471 A1 | 10/2010 | Takano et al. |
| 2010/0262933 A1 | 10/2010 | Kim et al. |
| 2011/0043530 A1 | 2/2011 | Nozuki |
| 2011/0055727 A1* | 3/2011 | Dawson ............... G06F 3/04815 715/753 |
| 2011/0087350 A1 | 4/2011 | Fogel et al. |
| 2011/0214071 A1 | 9/2011 | Zyda et al. |
| 2011/0219291 A1 | 9/2011 | Lisa |
| 2011/0267419 A1 | 11/2011 | Quinn et al. |
| 2011/0301760 A1 | 12/2011 | Shuster et al. |
| 2011/0313779 A1 | 12/2011 | Herzog et al. |
| 2012/0050257 A1 | 3/2012 | Clarke |
| 2012/0059941 A1 | 3/2012 | Cabasse et al. |
| 2012/0086727 A1 | 4/2012 | Korah et al. |
| 2012/0105326 A1 | 5/2012 | Jeong et al. |
| 2012/0113092 A1 | 5/2012 | Bar-zeev et al. |
| 2012/0120498 A1 | 5/2012 | Harrison et al. |
| 2012/0127062 A1 | 5/2012 | Bar-zeev et al. |
| 2012/0154277 A1 | 6/2012 | Bar-zeev et al. |
| 2012/0154557 A1 | 6/2012 | Perez et al. |
| 2012/0188148 A1 | 7/2012 | DeJong |
| 2012/0194418 A1 | 8/2012 | Osterhout et al. |
| 2012/0194552 A1 | 8/2012 | Osterhout et al. |
| 2012/0249480 A1 | 10/2012 | Keenan et al. |
| 2012/0249741 A1 | 10/2012 | Maciocci et al. |
| 2012/0289147 A1 | 11/2012 | Raleigh et al. |
| 2012/0311043 A1 | 12/2012 | Chen et al. |
| 2013/0007668 A1 | 1/2013 | Liu et al. |
| 2013/0021373 A1 | 1/2013 | Vaught et al. |
| 2013/0057550 A1 | 3/2013 | Kishikawa et al. |
| 2013/0069787 A1 | 3/2013 | Petrou |
| 2013/0083009 A1 | 4/2013 | Geisner et al. |
| 2013/0083063 A1 | 4/2013 | Geisner et al. |
| 2013/0106674 A1 | 5/2013 | Wheeler et al. |
| 2013/0117707 A1 | 5/2013 | Wheeler et al. |
| 2013/0120224 A1 | 5/2013 | Cajigas et al. |
| 2013/0125066 A1 | 5/2013 | Klein et al. |
| 2013/0182891 A1 | 7/2013 | Ling |

(56) References Cited

U.S. PATENT DOCUMENTS

| | | | |
|---|---|---|---|
| 2013/0191178 A1 | 7/2013 | Thompson et al. | |
| 2013/0194389 A1 | 8/2013 | Vaught et al. | |
| 2013/0226528 A1 | 8/2013 | Hodgins et al. | |
| 2013/0227017 A1* | 8/2013 | Gahlings | H04L 51/20 709/204 |
| 2013/0241805 A1 | 9/2013 | Gomez | |
| 2013/0246967 A1 | 9/2013 | Wheeler et al. | |
| 2013/0263016 A1 | 10/2013 | Lehtiniemi et al. | |
| 2013/0278531 A1 | 10/2013 | Pisaris-Henderson | |
| 2013/0293468 A1 | 11/2013 | Perez et al. | |
| 2013/0321265 A1 | 12/2013 | Bychkov et al. | |
| 2013/0335301 A1 | 12/2013 | Wong et al. | |
| 2013/0335303 A1 | 12/2013 | Maciocci et al. | |
| 2013/0335447 A1 | 12/2013 | Lu et al. | |
| 2013/0336629 A1 | 12/2013 | Mulholland et al. | |
| 2014/0063054 A1 | 3/2014 | Osterhout et al. | |
| 2014/0063055 A1 | 3/2014 | Osterhout et al. | |
| 2014/0101608 A1 | 4/2014 | Ryskamp et al. | |
| 2014/0111427 A1 | 4/2014 | Lindley et al. | |
| 2014/0164921 A1 | 6/2014 | Salinas | |
| 2014/0172906 A1 | 6/2014 | Sud et al. | |
| 2014/0229850 A1 | 8/2014 | Makofsky et al. | |
| 2014/0267581 A1 | 9/2014 | Cronin | |
| 2014/0280502 A1 | 9/2014 | Cronin | |
| 2014/0280503 A1 | 9/2014 | Cronin | |
| 2014/0280504 A1 | 9/2014 | Cronin | |
| 2014/0280505 A1 | 9/2014 | Cronin | |
| 2014/0280506 A1 | 9/2014 | Cronin | |
| 2014/0280644 A1 | 9/2014 | Cronin | |
| 2014/0282113 A1 | 9/2014 | Cronin | |
| 2014/0310643 A1 | 10/2014 | Karmanenko et al. | |
| 2015/0007114 A1 | 1/2015 | Poulos et al. | |
| 2015/0009132 A1 | 1/2015 | Kuriya et al. | |
| 2015/0062114 A1 | 3/2015 | Ofstad | |
| 2015/0123997 A1 | 5/2015 | Hayasaka et al. | |
| 2015/0212322 A1 | 7/2015 | Moravetz | |
| 2015/0213778 A1 | 7/2015 | Moravetz | |
| 2017/0004654 A1 | 1/2017 | Moravetz | |
| 2017/0090460 A1 | 3/2017 | Andrew et al. | |
| 2017/0150103 A1 | 5/2017 | Cronin | |
| 2017/0242479 A1 | 8/2017 | Cronin | |
| 2018/0082483 A1 | 3/2018 | Moravetz | |
| 2018/0097915 A1 | 4/2018 | Cronin | |
| 2019/0297172 A1 | 9/2019 | Cronin | |
| 2019/0306276 A1 | 10/2019 | Cronin | |
| 2020/0329123 A1 | 10/2020 | Cronin | |
| 2020/0379556 A1 | 12/2020 | Moravetz | |

FOREIGN PATENT DOCUMENTS

| | | |
|---|---|---|
| JP | H10-222287 | 8/1998 |
| JP | H11-095971 | 4/1999 |
| JP | 2002-351592 | 12/2002 |
| JP | 2003-280805 | 10/2003 |
| JP | 2011-228859 | 11/2011 |
| JP | 2013-168910 | 8/2013 |
| JP | 2013-258614 | 12/2013 |
| JP | 2018-190429 | 11/2018 |
| JP | 2020-115352 | 7/2020 |
| KR | 10-2011-0094693 | 8/2011 |
| KR | 10-2020-0029631 | 3/2020 |
| MX | 359047 | 9/2018 |
| RU | 111703 | 12/2011 |
| WO | WO 2013/138607 | 9/2013 |
| WO | WO 2015/112359 | 7/2015 |
| WO | WO 2015/112361 | 7/2015 |

OTHER PUBLICATIONS

Hollerer, T., et al., "User interface management techniques for collaborative mobile augmented reality", Computers and Graphics, 25(5):799-810, Dec. 2001.

Chinese Patent Application 2015-80005815.1 First Office Action dated Oct. 30, 2017.
European Patent Application 15740676.0 Extended European Search Report dated Jul. 6, 2017.
Japanese Patent Application 2016-548227 Notification of Reason(s) for Refusal dated Jul. 18, 2017.
Japanese Patent Application 2018-108517 Non-Final Notification of Reason(s) for Refusal dated Apr. 16, 2019.
Russian Patent Application No. 2016134577 Office Action dated Aug. 18, 2017.
Russian Patent Application No. 2016134577 Search Report dated Aug. 18, 2017.
Chinese Patent Application No. 2015-80005727.1 Third Office Action dated Jun. 13, 2019.
Chinese Patent Application No. 2015-80005727.1 Search Report dated Jun. 13, 2019.
Chinese Patent Application No. 2015-80005727.1 Second Office Action dated Dec. 11, 2018.
Chinese Patent Application No. 2015-80005727.1 Search Report dated Dec. 11, 2018.
Japanese Patent Application No. 2016-546976 Final Notification of Reason(s) for Refusal dated Jan. 22, 2019.
Japanese Patent Application No. 2016-546976 Non-Final Notification of Reason(s) for Refusal dated Jul. 31, 2018.
Japanese Patent Application No. 2016-546976 Decision for Refusal dated Jul. 18, 2017.
Japanese Patent Application No. 2016-546976 Notification of Reason(s) for Refusal dated Feb. 7, 2017.
Russian Patent Application No. 2016134268 Office Action dated Oct. 18, 2017.
Russian Patent Application No. 2016134268 Search Report dated Sep. 25, 2017.
PCT Application No. PCT/US2015/010990 International Search Report and Written Opinion dated May 11, 2015.
PCT Application No. PCT/US2015/010994 International Search Report and Written Opinion dated May 1, 2015.
U.S. Appl. No. 14/283,082 Office Action dated Jul. 1, 2016.
U.S. Appl. No. 15/447,342 Office Action dated Feb. 5, 2020.
U.S. Appl. No. 15/447,342 Final Office Action dated Sep. 5, 2019.
U.S. Appl. No. 15/447,342 Office Action dated Apr. 18, 2019.
U.S. Appl. No. 14/283,083 Office Action dated Sep. 30, 2015.
U.S. Appl. No. 15/239,382 Office Action dated Mar. 9, 2017.
U.S. Appl. No. 15/813,032 Office Action dated Jan. 24, 2018.
U.S. Appl. No. 14/460,272 Final Office Action dated Nov. 27, 2019.
U.S. Appl. No. 14/460,272 Office Action dated Apr. 18, 2019.
U.S. Appl. No. 14/460,272 Final Office Action dated Feb. 22, 2018.
U.S. Appl. No. 14/460,272 Office Action dated Jul. 5, 2017.
U.S. Appl. No. 14/460,272 Final Office Action dated Aug. 3, 2016.
U.S. Appl. No. 14/460,272 Office Action dated Jan. 14, 2016.
U.S. Appl. No. 14/460,273 Office Action dated May 15, 2019.
U.S. Appl. No. 14/460,273 Final Office Action dated Oct. 12, 2018.
U.S. Appl. No. 14/460,273 Office Action dated May 24, 2018.
U.S. Appl. No. 14/460,273 Final Office Action dated Nov. 2, 2017.
U.S. Appl. No. 14/460,273 Office Action dated May 10, 2017.
U.S. Appl. No. 14/460,275 Office Action dated Aug. 6, 2018.
U.S. Appl. No. 14/460,275 Final Office Action dated Nov. 8, 2017.
U.S. Appl. No. 14/460,275 Office Action dated Apr. 13, 2017.
U.S. Appl. No. 16/445,008 Office Action dated Mar. 23, 2020.
U.S. Appl. No. 14/460,276 Final Office Action dated Oct. 15, 2018.
U.S. Appl. No. 14/460,276 Office Action dated May 8, 2018.
U.S. Appl. No. 14/460,276 Final Office Action dated Nov. 9, 2017.
U.S. Appl. No. 14/460,276 Office Action dated Apr. 13, 2017.
U.S. Appl. No. 14/460,277 Office Action dated Sep. 1, 2016.
U.S. Appl. No. 15/832,022 Office Action dated Sep. 7, 2018.
U.S. Appl. No. 14/460,279 Final Office Action dated Feb. 1, 2018.
U.S. Appl. No. 14/460,279 Office Action dated Jun. 15, 2017.
U.S. Appl. No. 14/460,280 Final Office Action dated Oct. 30, 2018.
U.S. Appl. No. 14/460,280 Office Action dated Jun. 14, 2018.
U.S. Appl. No. 14/460,280 Final Office Action dated Nov. 9, 2017.
U.S. Appl. No. 14/460,280 Office Action dated Apr. 18, 2017.
U.S. Appl. No. 14/460,281 Final Office Action dated Feb. 29, 2016.
U.S. Appl. No. 14/460,281 Office Action dated Oct. 8, 2015.
U.S. Appl. No. 15/377,288 Office Action dated Aug. 29, 2017.

(56) References Cited

OTHER PUBLICATIONS

U.S. Appl. No. 14/460,272 Office Action dated Jun. 2, 2020.
U.S. Appl. No. 14/460,272, John Cronin, Personal Digital Assistance and Virtual Reality, filed Aug. 14, 2014.
Brazilian Patent Application No. BR1120160171810 Preliminary Office Action dated Apr. 28, 2020.
Chinese Patent Application 2015-80005815.1 Second Office Action dated May 31, 2018.
Indian Patent Application 201627025642 Examination Search Report dated Aug. 19, 2020.
Japanese Patent Application 2016-548227 Decision of Refusal dated Jan. 31, 2018.
Korean Patent Application 10-2016-7020346 Notice of Office Action dated Jun. 20, 2019.
Korean Patent Application 10-2020-7007152 Office Action dated Jun. 8, 2020.
Mexican Patent Application MX/a/2016/009682 Office Action dated Apr. 26, 2018.
PCT Application No. PCT/US2015/010990 International Preliminary Report on Patentability dated Jul. 26, 2016.
PCT Application No. PCT/US2015/010994 International Preliminary Report on Patentability dated Jul. 26, 2016.
U.S. Appl. No. 16/943,694 Office Action dated Sep. 16, 2020.
U.S. Appl. No. 16/445,008 Final Office Action dated Aug. 19, 2020.
U.S. Appl. No. 16/828,810 Office Action dated Aug. 4, 2020.
Korean Patent Application No. 10-2016-7020345 Office Action dated Dec. 14, 2020.
U.S. Appl. No. 17/202,499, John Cronin, Personal Digital Assistance and Virtual Reality, filed Mar. 16, 2021.
Japanese Patent Application 2020-037787 Non-Final Notification of Reason(s) for Refusal dated Feb. 2, 2021.
U.S. Appl. No. 16/828,810 Final Office Action dated Jan. 21, 2021.
Japanese Patent Application 2020-037787 Decision of Refusal dated Jun. 8, 2021.
U.S. Appl. No. 16/828,810 Office Action dated Jun. 18, 2021.
Brazilian Patent Application BR112016017199 Preliminary Office Action dated Apr. 28, 2020.

* cited by examiner

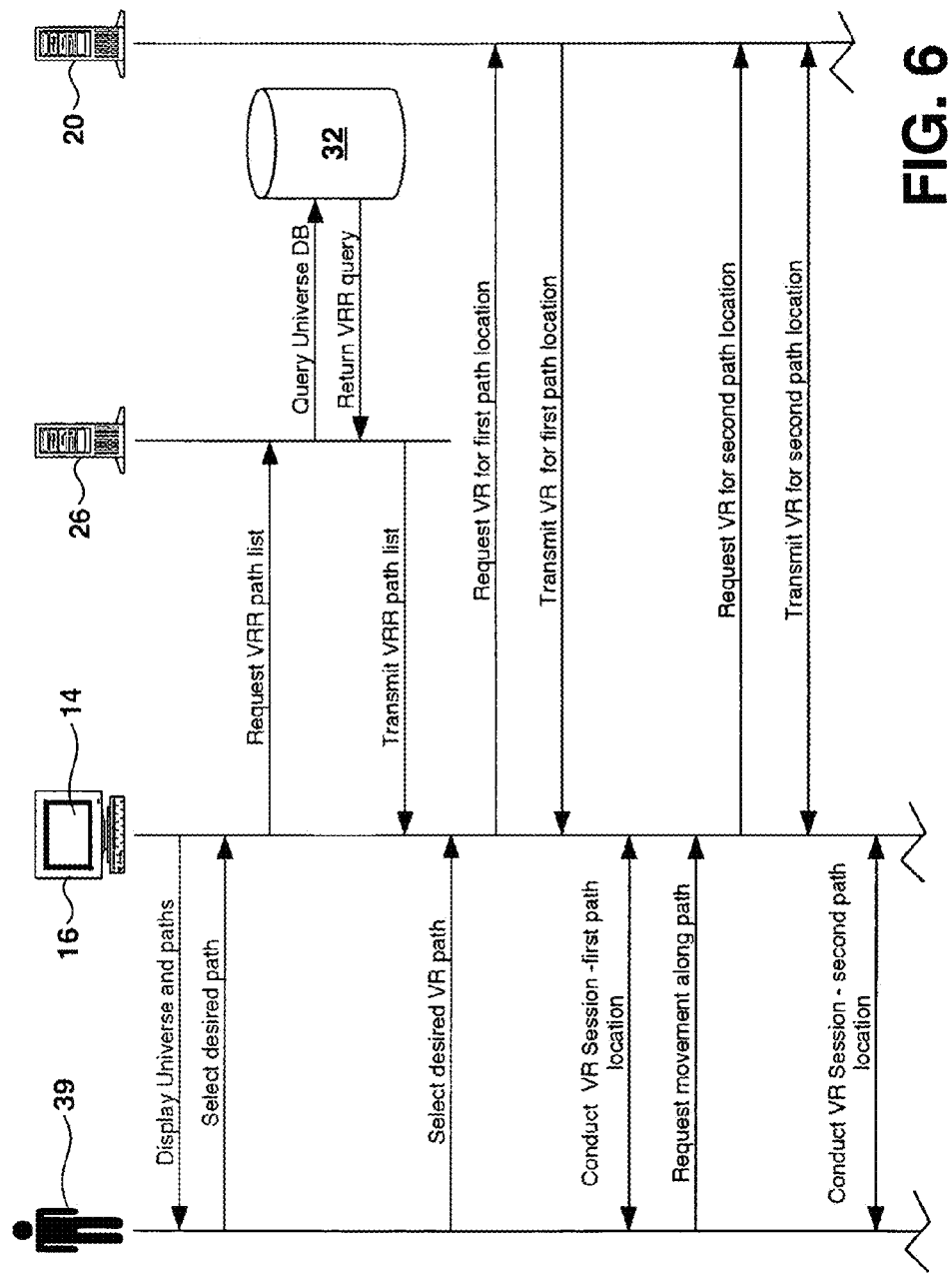

REAL TIME UNIFIED COMMUNICATIONS INTERACTION OF A PREDEFINED LOCATION IN A VIRTUAL REALITY LOCATION

CROSS REFERENCE TO RELATED APPLICATIONS

The present application is a continuation and claims the priority benefit of U.S. patent application Ser. No. 14/460,273 filed Aug. 14, 2014, now U.S. Pat. No. 10,565,240, which is a continuation and claims the priority benefit of U.S. patent application Ser. No. 14/147,430 filed Jan. 3, 2014, which claims priority to and the benefit of U.S. provisional patent application 61/786,569 filed Mar. 15, 2013, the disclosures of which are incorporated herein by reference.

BACKGROUND OF THE INVENTION

1. Field of the Invention

The present invention relates generally to computer-generated virtual reality representations of locations. Specifically, the present invention relates to storing, organizing, and providing access to a number of virtual reality representations via a network, the invention further relates to the connection of two simultaneous visitors linked by prompting of a previous visitor or a visitor who's address (from a social media database) is close to the geo-location of the selected space.

2. Description of the Related Art

Virtual reality (VR) models and simulates views from a location in virtual space. The visitor perceives the view from virtual space on a computer monitor or specialized display, and experiences "movement" by changing position or orientation within the virtual space. The visitor may even be "teleported" to different points in the virtual space.

Although recognized as having substantial potential, virtual reality has remained limited mainly to computer games and expensive training simulations. As explained below, virtual reality representations model a single virtual space, and authoring virtual reality representations requires specialized computer programming or graphics skills. These factors have hindered broader adoption of virtual reality.

Also, there are many inventions in the prior art for establishing real time communications between visitors in a virtual reality setting, such as United States Patent Application 20080262910, "Methods and systems to connect people via virtual reality for real time communications", which describes methods and systems for connecting people for real time communications via a virtual reality environment where one embodiment includes: a virtual reality server to host a virtual reality world and to present, to a customer in the virtual reality world, an advertisement including a reference assigned to the advertisement; a session border controller to interface with a packet switched network; and one or more telecommunication servers coupled to the session border controller to connect the customer to an advertiser of the advertisement for real time communications in response to a request received via the reference embedded in the advertisement and presented to the customer in the virtual reality world. In one embodiment, the advertiser is charged an advertisement fee based on connecting the customer and the advertiser for real time communications via the advertisement presented in the virtual reality world.

Other prior art, such as U.S. Pat. No. 7,269,632, "Networked computer system for communicating and operating in a virtual reality environment" relates to interactive virtual reality networked computer systems and methods that facilitate communication and operation in a virtual reality environment. The virtual reality networked computer system has an infrastructure that includes a number of visitors, hosts and servers. The interconnected hosts and servers allow visitors to effectively locate, activate, access and interact within virtual reality environments in a variety of different ways. For example, visitors can establish visitor groups such that interaction within the virtual reality environment occurs between hosts (accessed by visitors) without the need of a central or dedicated server.

In the prior art, there are many ways to link to visitors by invites or proactive requests to invite visitors to "join the game" or "creating a chat experience with a domain expert linked to a VR universe space". However, the prior art does not yet take advantage of the large and growing social media data sets, where visitors of social media store the addresses as well as their interests online. Social media technologies as defined by Facebook or linkedin have large repositories of geo location based data. An improvement to the virtual reality experience is to leverage the social media data sets in two ways, first is to use it to invite new visitors based upon either the definition of a VR location or second invite new visitors based upon a visitor in a VR space. An additional improvement is to use the data associated with the VR database to be available by the social media datasets directly, that is, to "feedback VR data to real data". In this way, real data gets annotated by VR data and vice versa, providing the feedback look to improve the VD experience.

A virtual reality representation models a single volume, area, or point within virtual space. The representation may model physical space, such as a location or region on the Earth, or may model imaginary space in a video game. The visitor can move around in the virtual space, but is limited to remaining in that virtual space.

Two authors may create virtual reality representations of the same location, or of related locations. These representations may exist on different websites, servers, or computers. These representations can be organized or searching and the representations can be offered to the visitor so that they may be logically viewed together. This is described in U.S. Pat. No. 7,298,378 "Virtual reality universe realized as a distributed location network".

It would be desirable that the representations be connected together in a way that enables the visitors to experience real time communications with each other, for visitors who (a) are sharing the same virtual reality space, (b) for visitors who have come to the same space at different times or (c) for a first visitor in a space to be linked to a new person whose geolocation or whose interests align that virtual reality space. For example, if communications with visitors that relate to the locations modeled the same physical location, the visitor could choose not only who to interact with but how to interact with other visitors in a real-time way or even in an asynchronous way. If the locations modeled adjacent physical locations, the real-time connected visitors could experience moving from one virtual location to another together. This creates a "virtual universe" made of separate virtual reality representations that can be toured by visitors together based upon (a) are sharing the same virtual reality space, (b) for visitors who have come to the same space at different times or (c) for a first visitor in a space to be linked to a new person whose geolocation or whose interests align with that virtual reality space.

Even if representations generated by different authors can be logically connected together in a virtual universe, there remains an additional need to simplify authoring of virtual reality representations so that real-time connection between visitors is possible. The programming and graphic skills required by conventional VR software makes creation of virtual reality representations a relatively complex and expensive process. The easier and faster virtual reality representations can be created, the easier and faster a rich and varied virtual universe can be created and offered to visitors.

Thus, there is a need for logically connecting virtual reality representations together to form a virtual universe. In addition to conventional virtual reality software, a simplified method of creating virtual reality presentations is needed to encourage creation of the virtual universe where real-time connection between visitors is possible.

SUMMARY OF THE CLAIMED INVENTION

The invention is a network capable of connecting virtual reality representations together to form a virtual universe. The virtual reality representations can be in a simplified virtual reality format that requires no special computer programming or graphics skills to create.

A network in accordance with the present invention includes a number of virtual reality representations, each virtual reality representation representing a location in a virtual universe and defined by VR data stored on the network at a network address. The network also includes the ability to connect visitors together in both real-time and in pseudo-real-time by either voice, text, messaging, video, or any combination of unified communications modalities.

A database stores the network address and the location in the universe of each virtual reality representation. A database server provides access to the database. The database server generates a list of locations in response to a location query from a visitor, and provides the network address of the virtual reality representation of a selected location.

The visitor connects to the network using a client host adapted to communicate with the domain server. The host receives data representing the network address of the VR data server associated with a selected VR representation. The host is also adapted to communicate with the VR data server to access the VR data set defining the VR representation. The host is also adapted to use the location that the visitor selects to establish either real-time or pseudo-communication to attract other visitors to join the VR experience.

In using the network, the visitor is preferably presented with a map displaying locations in the virtual universe. Each location is associated with a virtual reality representation accessible through the network. The visitor selects a location on the map he or she desires to visit. The domain server receives the selected location and retrieves from the database the network location of the data server providing access to the selected virtual reality representation. The domain server transmits the network address of the data server to the host, and the host communicates with the data server to receive the VR data defining the virtual reality representation. The domain server also finds visitors that are (a) sharing the same virtual reality space, (b) visitors who have come to the same space at different times, or (c) a visitor to be linked to a new person whose geolocation or whose interests align with that virtual reality space.

In one possible embodiment, the client host includes a monitor that displays both the map and the virtual reality presentation generated from the VR data. In other possible embodiments the virtual reality presentation can utilize specialized hardware separate from the map display.

In preferred embodiments of the present invention, the network stores data representing paths in the virtual universe. A path is defined by at least two different locations in the universe. When the domain server receives a message from the host requesting virtual movement from a first location to a second location, the domain server communicates the network address of the data server associated with the second location to the host. The domain server also finds visitors that are (a) sharing the same virtual reality space, (b) visitors who have come to the same space at different times or (c) a visitor to be linked to a new person whose geolocation or whose interests align with that virtual reality space. The host then communicates with that data server and transitions from the first VR presentation to the VR presentation of the second location. The visitor perceives a substantially continuous movement along the path from the first location to the second location without leaving the virtual universe. The first visitor also now has a second visitor or more sharing with an interacting with the substantially continuous movement along the path the first location to the second location without leaving the virtual universe.

Paths can be defined in different ways in alternative embodiments of the network. The domain server can store predefined path definitions by storing a list of the locations defining the path. Alternatively, the domain server stores a data record for each location in the universe. The data set records the adjacent locations in the universe to define a path from each location to adjacent locations. In other alternative embodiments the path is defined in response to system events and then made available to the visitor.

The network preferably includes administrative software that enables new virtual reality representations to be added to the network. The network also includes administrative software to set up connections to create communications between an initial visitor of the virtual reality location and visitors that are found that are (a) sharing the same virtual reality space, (b) visitors who have come to the same space at different times, or (c) a visitor to be linked to a new person whose geolocation or whose interests align with that virtual reality space. The virtual reality representations can be stored on existing data servers on the network, or stored on data servers that are themselves added to the network. The database is updated to reflect the new locations in the virtual universe and the network addresses of the data servers accessing the representations.

In one advantageous embodiment of the present invention, the virtual universe is divided into public and private regions. Any author can add to the network a virtual reality representation of a location in the public region of the universe. Only authorized authors can add representations in private regions of the universe. The present invention allows for the differentiation of communications of finding visitors that are (a) sharing the same virtual reality space, (b) visitors who have come to the same space at different times, and/or (c) a visitor to be linked to a new person whose geolocation or whose interests align with that virtual reality space for those new visitors to either be public or private.

In another advantageous embodiment of the present invention, the network is operated as a self-regulating virtual reality universe. The network preferably provides visitor access to a number of virtual reality representations, as well as many possible new visitors each authored by a different author. The domain server receives ratings from visitors to the quality of the virtual reality representations they visited, and assesses the quality of each virtual reality representation based on the ratings provided by the visitors.

Action is then taken regarding a virtual reality based on the assessed quality of the virtual reality representation. The quality can be rated as a running average of visitor ratings as well as the running average of invited visitors. If the rating falls below a predetermined score, the initial visitors access to the representation can be removed or the representation can be removed from the network. Preferably the action is taken automatically and without human intervention so that the network is self-regulating.

To simplify creation of virtual reality representations, the VR data can be stored in a simplified file format that stores digital photographs taken from a specific geographic location. An author takes a number of photographs from the location with a digital camera. The photographs or videos are preferably in JPG format but other "digital film" formats can be used. Each photograph preferably is taken in a different viewing direction, preferably viewing north, south, east, and west. The images are uploaded to the network along with geographical data (for example, latitude and longitude) that identifies where the photographs were taken. The domain server stores the images, the viewing direction associated with each image, and geographical data in a single data file on a data server. The domain server updates its database, associating the geographical location with a virtual location in the virtual universe. The virtual representation is now accessible to visitors, and the photographs are displayed when generating the virtual reality presentation of the virtual location.

A virtual reality network in accordance with the present invention offers many advantages. A number of different virtual reality representations are made available to visitors through a single, centrally accessible domain server where one visitor can invite other visitors to share the experience from finding visitors that are (a) sharing the same virtual reality space, (b) visitors who have come to the same space at different times or (c) a visitor to be linked to a new person whose geolocation or whose interests align with that virtual reality space. The domain server enables visitors to experience virtual reality representations created by different authors, and to tour a virtual universe created by logically organizing and connecting the separate representations.

Authors can easily add new virtual reality representations to the network, enabling visitors to experience a virtual reality universe that grows richer and richer with time. With the simplified VR file format, persons may share with others their travels to places around the world, or may easily create their own virtual universe for business or private use.

In another aspect of the invention, the authors themselves can be connected to others related to persons that are linked to a new person whose geolocation or whose interests align with that virtual reality space. In this way, a real-time communication between the author and a potential new person whose geolocation or interest aligned with the virtual reality space is created, which allows the author to obtain for the data it even potentially images that can be downloaded from the new person communicated with. In this way the virtual reality universe data can be greatly enhanced.

Other objects and features of the present invention will become apparent as the description proceeds, especially when taken in conjunction with the accompanying eight drawing sheets illustrating an embodiment of the invention.

Particularly the objects of the invention are to establish a virtual reality universe where a visitor can find other visitors that are (a) sharing the same virtual reality space, (b) visitors who have come to the same space at different times, and/or (c) a visitor to be linked to a new person whose geolocation or whose interests align with that virtual reality space, and (d) where authors can be linked to a new person whose geolocation or whose interests align that virtual reality space. In this way, a real-time communication between the author and a potential new person whose geolocation or interest aligned with the virtual reality space is created, which allows the author to obtain for the data it even potentially images that can be downloaded from the new person communicated with. In this way the virtual reality universe data can be greatly enhanced.

BRIEF DESCRIPTION OF THE DRAWINGS

FIG. 6 is a sequence diagram similar to FIG. 4 illustrating a visitor moving along a path in the virtual universe;

DETAILED DESCRIPTION

Embodiments of the present invention includes a system and method for enabling a visitor to access VR representations authored by different authors of locations in a virtual universe via a computer network. The system and method include memory for storing a plurality of VR data sets, each VR data set defines a VR representation of a location. Each VR data set also defines a link to other visitors or to other third party data. Each data set is independently authored by a respective author different from the other authors. The system and method includes means for receiving and storing a VR data set from the author of the VR data set. There are one or more VR data servers adapted to access and transmit the VR data sets and each VR data set is associated with a VR data server for access to the VR data set. A domain server adapted to transmit domain data which includes the location within the universe of each VR representation and the network address of the VR data server associated with the VR representation. A client host is adapted to communicate with the domain server to receive domain data representing the network address of the VR data server associated with a selected VR representation. The client host is further adapted to communicate with the VR data server to access the VR data set that defines the VR representation without leaving the virtual universe. The host computer further adapts to connect to a social media cloud to establish either real-time or pseudo-real-time connections based upon any unified communications modality.

Users or visitors may use any number of different electronic computing client devices, which can include, but is not limited to, general purpose computers, mobile phones, smartphones, personal digital assistants (PDAs), portable computing devices (e.g., laptop, netbook, tablets), desktop computing devices, handheld computing device, or any other type of computing device capable of communicating over a communication network. Such devices are preferably configured to access data from other storage media, such as, but not limited to memory cards or disk drives as may be appropriate in the case of downloaded services. Such devices preferably include standard hardware computing components such as, but not limited to network and media interfaces, non-transitory computer-readable storage (memory), and processors for executing instructions that may be stored in memory.

Figure 1:
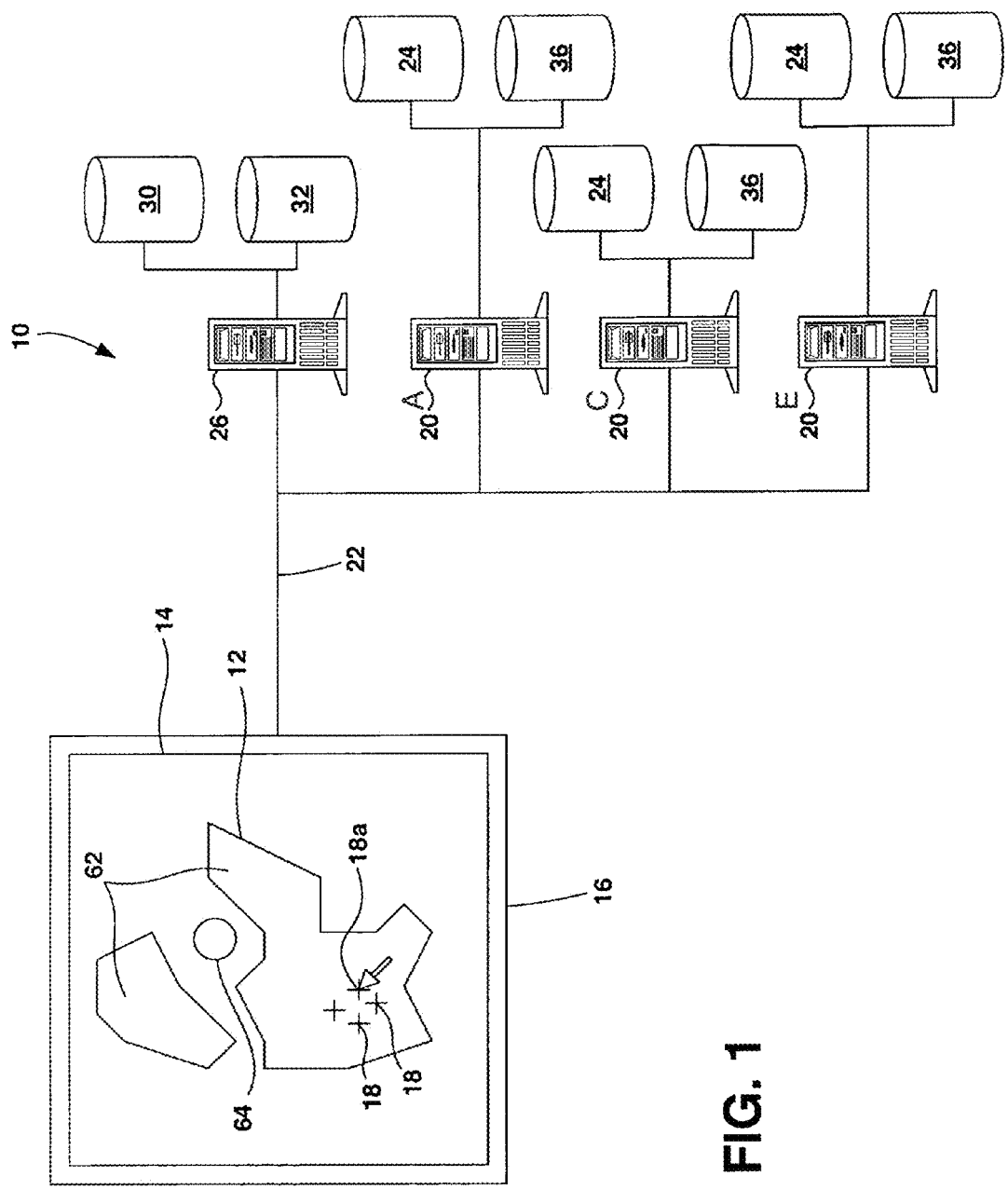
FIG. 1 is a schematic view of a virtual reality universe realized as a distributed location network in accordance with the present invention.

FIG. 1 illustrates a distributed location network 10 in accordance with the present invention.

The network 10 enables a visitor to visit and explore a virtual universe. FIG. 1 illustrates a map 12 of the virtual universe displayed on a visitor's computer monitor by a software program or virtual reality browser (VR browser) 14 running on a visitor's computer 16 connected as a network client. The universe can model a real or tangible space, such as the surface of the Earth, with the universe representing real or tangible locations in physical space. Alternatively, the universe can model an imaginary space, such as L. Frank Baum's Oz or a stick model of a protein molecule, with the universe representing imaginary locations in nonphysical space.

The network 10 is preferably a local, proprietary network (e.g., an intranet) and/or is alternatively a part of a larger wide-area network (e.g., the cloud). The network 10 can be a local area network (LAN), which is communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provide.

The visitor explores the universe by selecting and viewing virtual reality presentations of virtual locations or points 18 on the map 12. Each point 18 represents a location in the universe that has at least one virtual reality representation available for a visitor to access and experience. A point 18 can model a point, area or volume in the virtual universe, and a visitor may be capable of moving about the area or volume if the virtual reality presentation enables it.

The VR browser 14 retrieves the data for the virtual reality representations from virtual reality data servers (VR data servers) 20A, 20C, and 20E. VR data servers 20A, 20C, and 20E are connected to the browser 14 by network connections 22. The network connections 22 may be through a Local Area Network (LAN) or a global network such as the Internet. VR data servers 20A, 20C, and 20E may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Each VR data server 20A, 20C, and 20E provides access to VR data 24 for a virtual reality representation of the selected point 18. Data can be stored in conventional virtual reality file formats such as QUICKTIME, X3D, VRML, and the like, or can be stored as separate digital image files. VR data 24 can be stored on the VR data server 20A, 20C, and 20E or stored on additional network data servers (not shown) distributed through the network 10.

The entire network 10, including the network client 16 and the servers 20A, 20C, and 20E and 26, may also be hosted on a single computer if a distributed network is not required.

A point 18 may have a number of different virtual reality representations served by a number of different VR data servers 20A, 20C, and 20E. These representations may be stored in different file formats, may represent the point in different seasons of the year or in different historical eras, or may provide an alternative or augmented visitor interface or sensory experience. Of course, a particular data server 20A, 20C, or 20E could serve a number of virtual reality representations of a point 18 or different points 18.

A domain server 26 hosts a universe database 30 for displaying the map 12 and the points 18 on the map 12. The database 30 preferably includes graphic files, image files, and other data for generating and displaying the map 12. The universe database 30 may also include the network addresses or network paths to the VR files associated with the virtual reality representations.

The domain server 26 also maintains a network database 32 that stores information about each point 18 and the network addresses of the one or more VR data servers 20A, 20C, and 20E that provide access to VR representations of the point 18.

The network database 32 holds a number of virtual reality representation records (VRR records) 34. The VR browser 14 also connects to a server that connects to a real-time communications social media cloud Social media cloud may be in communication with social media sites such as Facebook, LinkedIn, or others social media sites.

Figure 2:
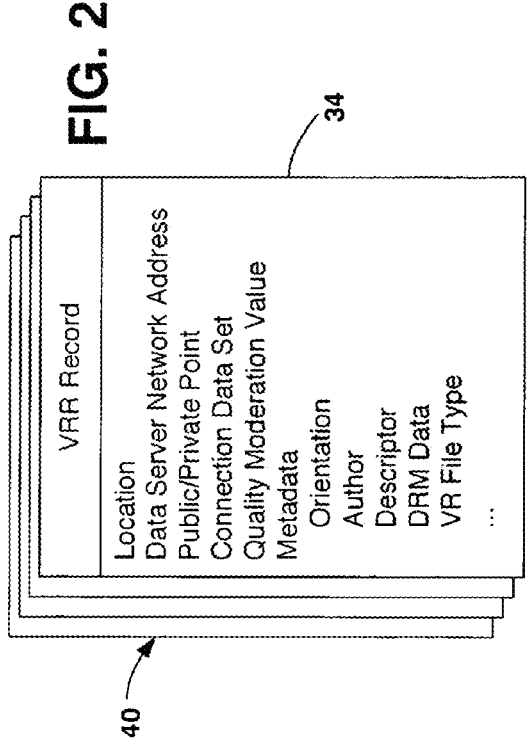
FIG. 2 is a schematic view of a virtual reality representation record used in the network shown in FIG. 1.

FIG. 2 illustrates a typical VRR record 34. The VRR record 34 is a data structure that provides information enabling the VR browser 14 to locate the VR data server 20 providing access to a specific VR representation. A VRR record 34 includes the location of the point 18 and the network address of the VR data server 20A, 20C, and 20E associated with the VR representation of the point 18.

The VRR record 34 preferably also includes metadata providing additional information about the point 18, the associated VR data server 20A, 20C, or 20E, and the virtual reality representation of the point 18. Metadata can include the author, VR file format, or a description of the VR representation. Other metadata can include digital rights management (DRM) information, initial orientation or direction of the default opening view of the virtual reality representation, or the like.

Each VR data server 20A, 20C, and 20E maintains a local database 36 that records the location or locations of the VR data 24 accessed through the VR data server 20A, 20C, and 20E (see FIG. 1). The local database 36 holds a virtual reality record (VR record) 38 for each representation accessed through the VR data server 20A, 20C, and 20E.

Also shown in FIG. 2 for VRR list 40, is metadata for "other visitors links", that is predetermined links (email address, text address, cell phone or telephone number, or any unified communications address) to other potential visitors. In this way, when a virtual reality space is chosen based upon the geolocation, the predefined other visitors links can be "polled" and established.

Also shown in FIG. 2 for VRR list 40, is metadata for "other third party data", that is data that was downloaded by the author who created the VRR list 40, from the real-time connection of the author to other persons (who shared the same geolocation or interest) obtained from any of the social media sites. For instance, when the author is the finding a VRR list location, they may search a social media site for individuals whose address is nearly identical to the VRR list location. The system allows for connection between the author and these individuals, either real-time or pseudo-real-time to messages or emails. Any individuals who cooperate with the author can send to the author their personal data of images of photographs or other such data and allow the author to post that data in the VRR list record for that location in the metadata group for "other third party data". It should be understood that when any visitor visits a particular location, that visitor's links are stored in the other visitors links metadata of that particular VRR list record.

Figure 3:
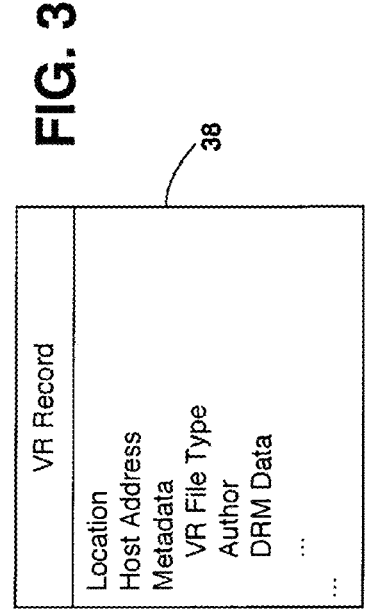
FIG. 3 is a schematic view of a virtual reality record used in the network shown in FIG. 1.

FIG. 3 illustrates a typical VR record 38. The VR record 38 is a data structure that includes the location of the point 18, the location of the VR data 24 for the representation of the point, and metadata containing further information about the VR data 24. For example, such metadata may include the author and digital rights management (DRM) information, VR data format, or descriptive information about the VR representation.

The universe database 30, the network database 32, or a local database 36 can be realized as a single-file relational database, object database, or hierarchal XML database. Alternatively, a database 30, 32, 36 can be realized as a number of separate data files, wherein each data record is stored in a respective data file. The data file can be in structured text file format, XML format, or other conventional data format. The selection of database schema and format is based on conventional software engineering considerations, including the network architecture, the network load, and available software.

FIG. 3 may also include an individual VRR list record having metadata "other visitors' links" and "other third party data" as described in FIG. 2.

Figure 4:
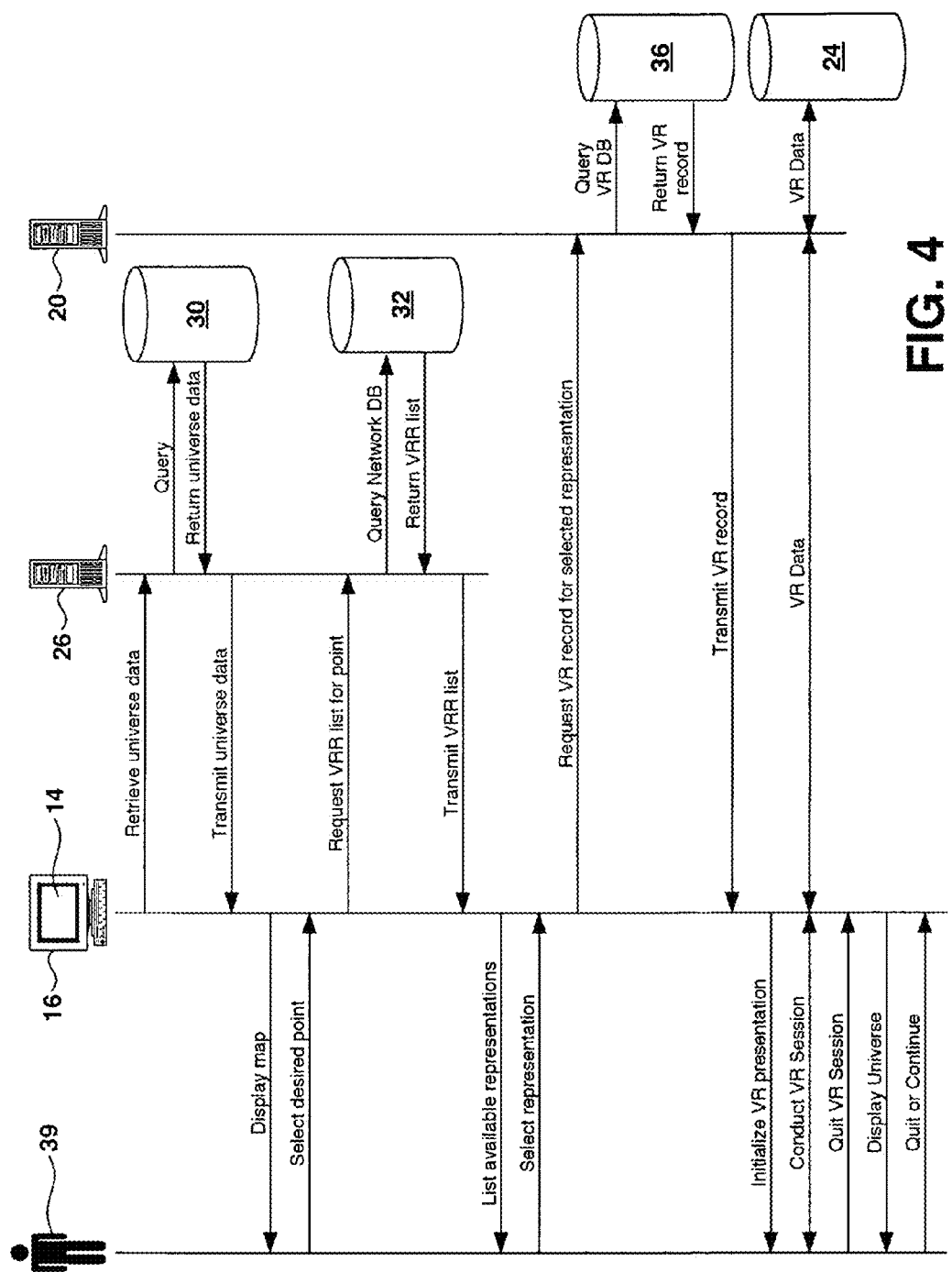
FIG. 4 is a sequence diagram illustrating a visitor utilizing a client host communicating with the network shown in FIG. 1 to view a location in the virtual universe.

FIG. 4 illustrates a first visitor session wherein a visitor 39 explores the virtual universe point-by-point. For clarity only one visitor is shown connected to the network 10, but it should be understood that a number of visitors can simultaneously explore the universe. It should also be understood that when a visitor enters the session and chooses a geolocation, the system will automatically invite new visitors: (a) who are sharing the same virtual reality space, (b) who have come to the same space at different times, and/or (c) are to be linked to a new person whose geolocation or whose interests align with that virtual reality space.

The VR browser 14 retrieves the map data 30 from the domain server 26 and begins the visitor session by displaying the map 12 shown in FIG. 1. The map 12 displays the points 18, and the visitor interface of the VR browser 14 enables the visitor 39 to select which point 18 and the representation of the selected point 18 he or she would like to experience.

It should be understood that the universe database 30 may include or enable generation of a number of different maps representing different regions or sub-regions of the universe. The VR browser 14 may simultaneously or sequentially display different maps during a visitor session. For example, the visitor is initially presented with a "master map" or model of the entire universe. If the virtual universe is sufficiently extensive, the visitor interface of the VR browser 14 enables visitors to "drill down" and select more detailed maps or models of sub-regions (for example, maps representing a continent, a country, a city, and then a city block) to select a desired point 18.

Map 12 should therefore be understood to represent all possible maps the VR browser 14 may display as part of its visitor interface. Maps may be representations of one-dimensional, two-dimensional, three-dimensional, or n-dimensional space as is appropriate for the virtual universe such maps represent.

The map 12 may also display additional information that assists the visitor in selecting a point or a VR representation of the point. For example, the map might indicate points of historical interest or the number and types of virtual reality representations available for each point.

In the illustrated embodiment, the visitor selects a desired point 18a from the map 12 by clicking the mouse (see FIG. 1). The browser 14 determines the location of the selected point 18a on the map and requests VRR list 40 of VRR records 34 associated with that point from the domain server 26 (see FIG. 2).

The domain server 26 queries the network database 32 for the list of VRR records of points at or proximate to the selected point 18a. The domain server 26 returns the VRR list 40 to the VR browser 14. The VR browser 14 generates a list of available VR representations from the VRR list 40, and displays the list for the selected point 18a.

The display list can include information from the metadata to assist the visitor in selecting a VR representation to experience. For example, the VR browser 14 might display an icon for each representation indicating some characteristic of the representation (such as season of the year, its VR file format, or quality moderation value (discussed in further detail below)).

The visitor selects from the display list the desired virtual reality representation to experience. If there is only one representation associated with the selected point, the steps of displaying and selecting from the list can be eliminated.

The VR browser 14 uses the VRR record 34 associated with the selected representation to look up the network address of the VR data server 20 providing access to the virtual representation. The VR browser 14 requests the VR record 38 for the selected representation from the VR data server 20. The VR browser 14 uses the returned VR record 38 to fetch the VR data file 24 and initialize a virtual reality presentation that will be perceived and experienced by the visitor 39. For example, the VR browser 14 could start one helper application to display a QUICKTIME presentation and another helper application to display a VRML presentation.

In the illustrated embodiment, the VR browser 14 displays the map 12 in a first window and the virtual reality presentation in a second window (discussed in greater detail later). In other embodiments, virtual reality presentations could be displayed independently of the VR browser 14 through more specialized or augmented VR hardware, such as a headset.

During the VR presentation, the VR browser 14 receives input from the visitor and communicates with the VR data server 20 to fetch the VR data 36. The visitor can change the point of view and move about the presentation as permitted by the virtual reality representation being experienced. When the visitor ends the VR presentation, the window displaying the VR presentation closes or goes blank. The visitor 39 can then select a new point 18 or quit the application.

In addition to exploring selected points 18, the network 10 enables the visitor 39 to explore paths through the universe. See, for example, path 42 shown in FIG. 5. A path is defined as extending along a set of points or extending between start and end points in the universe. The network 10 supports multiple types of paths as will be described in further detail below.

A visitor sequentially experiences virtual reality presentations of the points 18 on the path. The VR browser 14 automatically moves from displaying one VR presentation to the next in response to visitor input indicating movement along the path. This provides the visitor with the perception of walking through or being "immersed" in the universe. If the points 18 are sufficiently close together, the visitor will essentially perceive continuous or seamless movement through the virtual universe.

Path 42 represents a pre-defined path. A pre-defined path is defined prior to the visitor session and may, for example, represent a virtual river, highway, or historical trail through the universe. Pre-defined paths are preferably defined in the universe database 30 and represented on the map 12 for selection by the visitor 39.

Once the VR location is displayed, the VR browser 14 sends the location to a server that queries the social media cloud to find other visitors, which in turn sends the communications link data back to the server which in turn establishes unified communications between the first visitor and the new visitors. Thus real-time communication or pseudo-real-time communication is established between the first visitor and new visitors.

Figure 5:
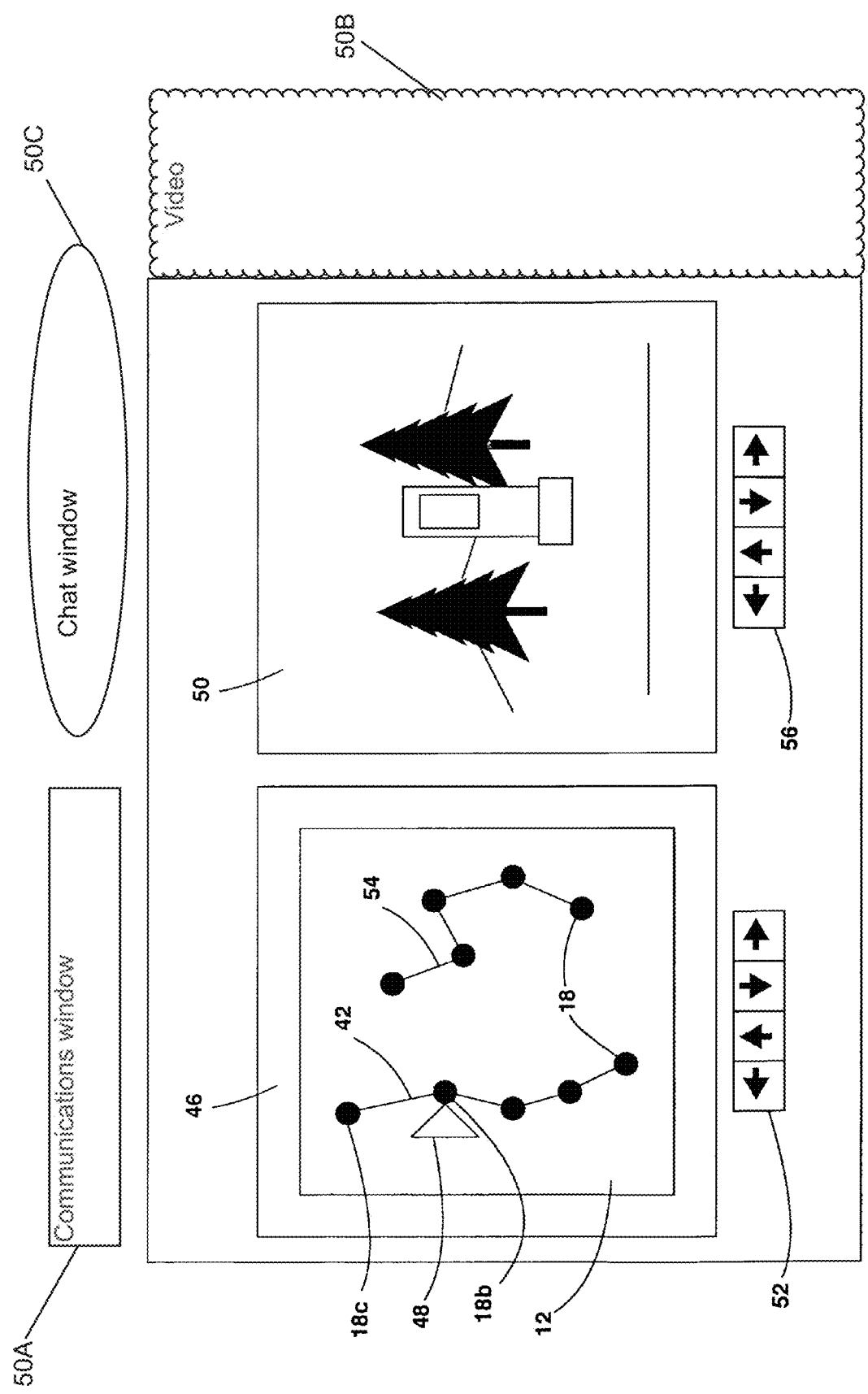
FIG. 5 is a view of the client host display displaying a map of the universe and a virtual reality presentation of a location in the virtual universe.

FIG. 5 illustrates the VR browser 14 with a first display window 46 and a second display window 50. Display window 46 displays the map 12, the path 42, and the points 18 along the path 42 as shown. The second window 50 displays the virtual reality presentation of the active, or currently visited, point 18*b*.

When displaying a virtual reality presentation of a point 18, the VR browser 14 preferably displays an icon 48 indicating the active point 18. The illustrated icon 48 is an arrow that also indicates the approximate direction of the current line of view of the virtual reality presentation shown in the second window 50. Icon 48 is shown indicating that point 18*b* is the active point and that the direction of the current line of view is west.

Navigation widgets 52 associated with the first window 46 enable the visitor to move along the path 42 or to move to a different path (such as a second path 54). Navigation widgets 56 associated with the second window 50 enable the visitor to change the line of view of the VR presentation in the second window 50. Widgets 52 and 56 can be combined into a single control if desired, and alternative known interface controls (including the mouse) or other interface widgets may replace or be used with the widgets 52, 56.

FIG. 5. also shows real-time or pseudo-real-time unified communications window 50A with example real-time video 50B for example or real-time chat window 50C. In this way, any visitor can be interacting with other new visitors (a) who share the same virtual reality space, (b) who have come to the same space at different times or (c) who are linked to a new person whose geolocation or whose interests align that virtual reality space.

FIG. 6 illustrates a second visitor session in which the visitor moves along and explores the path 42 (the database 36 and VR data 24 are omitted from the drawing). The VR browser 14 retrieves the map and path data from the universe database 30 and displays the map 12 as shown in FIG. 5.

The visitor selects the desired path 42, and the VR browser 14 obtains the VRR record list 40 for the points 18 on the path 42 from the domain server 26. For simplicity, it is assumed that each point 18 on the path 42 has only one virtual reality representation; so each VRR record 34 is associated with a single point 18 on the path 42.

The VR browser 14 uses the VRR record 34 associated with the path's starting point 18*c* to look up the network address of the appropriate VR data server 20 and retrieves the VR record 38 from that server 20. The VR record data is used to initialize and display the virtual reality presentation of the first, or starting point 18*c* (see FIG. 5). Widgets 56 control the line of view of the virtual reality presentation as described.

Widgets 52 move the visitor to the next, or second point on the path 42. The VR browser 14 uses the VRR record 34 associated with the next point to retrieve VR data for the next point. If the points 18 along the path 42 are sufficiently close, the transition from point to point appears to the visitor as a continuous movement along the path.

In moving from the virtual reality representation of one point to another, the VR browser 14 may also maintain (as closely as possible) the same line of view to maintain the appearance of continuous movement. For example, if the visitor is looking south and moves to the next point, the initial line of view for the next point is also viewing south. In alternative embodiments, however, the VR browser 14 can initialize each virtual reality presentation with a predetermined or default line of view.

Figure 7B:
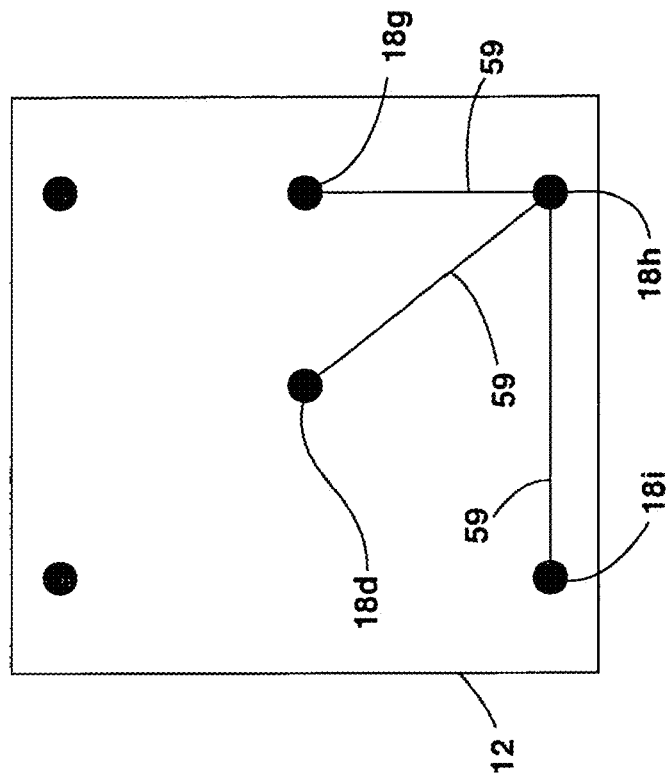
FIGS. 7a and 7b represent paths in the virtual universe extending between adjacent locations in the universe.
Figure 7A:
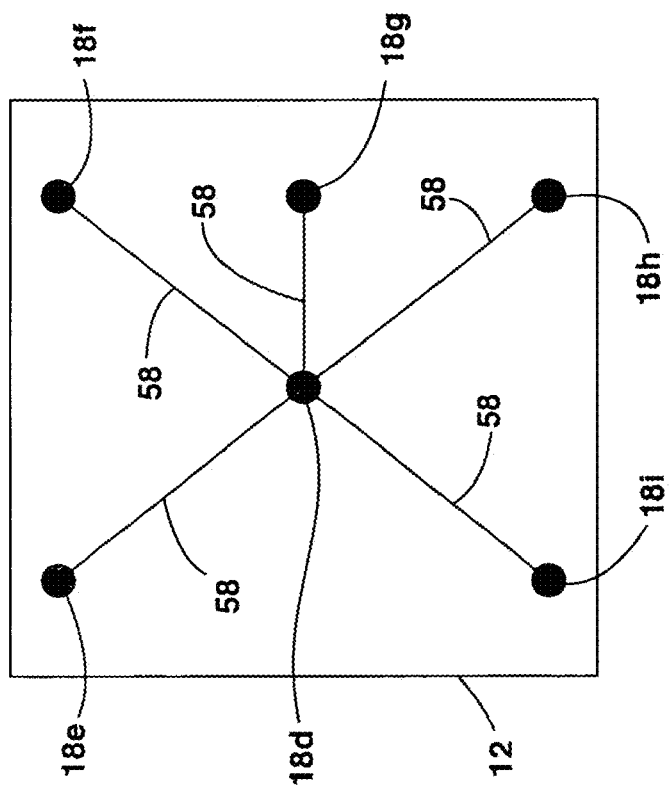

A second type of path preferably supported by the network 10 is a connection path. A connection path is a dynamic path generated from an active point 18 to adjacent points 18 during the visitor session. FIG. 7*a* illustrates the map 12 displaying connection paths 58 extending between an active point 18*d* and adjacent points 18*e*-18*i*. Connection paths 58 connect two adjacent or neighboring points 18, enabling the visitor to pick and choose his or her own route through the universe.

The connection paths 58 typically provide multiple routes between points. For example, the visitor can move from point 18*d* to point 18*h* directly, or can move first to point 18*g* and then to point 18*h*. FIG. 7*b* illustrates the connection paths 59 when the visitor reaches point 18*h*. The paths 59 start from point 18*h* and end at points 18*d*, 18*g*, and 18*i*.

The VRR record(s) 34 for each point 18 preferably includes a connection data set (see FIG. 2) that lists adjacent points 18. For example, the connection data set for point 18*d* (shown in FIG. 7*a*) includes points 18*e*-18*i* and the direction to each point. This enables the VR browser 14 to display the connection paths 58 available to the visitor; the VR browser 14 can also iteratively retrieve the VRR records of adjacent points to display a network of available paths on the map 12. The connection data set also allows the VR browser 14 to efficiently respond and display the next virtual reality presentation after receiving a visitor request to move in a given direction from active point 18*d*.

The domain server 26 generates the connection data set when a new point 18 is added to the network. The adjacent points 18 are retrieved from the universe database 30 to generate the connection data set for the new point 18.

Figure 9:
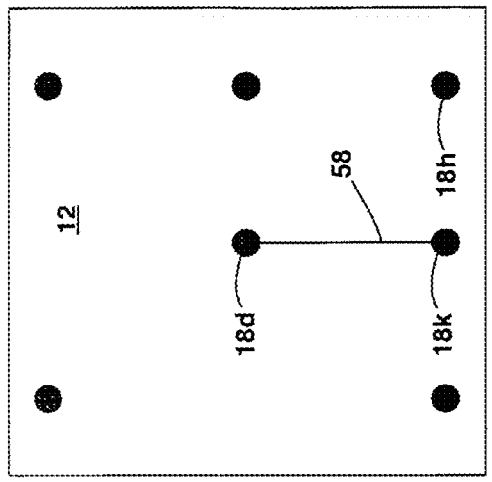
FIGS. 8-10 illustrate other paths in the virtual universe.
Figure 8:
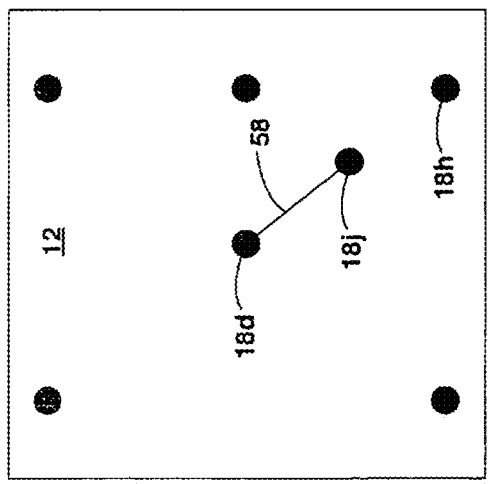

The domain server 26 also modifies the connection data set of adjacent points 18 as illustrated in FIGS. 8 and 9. The maps 12 in FIGS. 8 and 9 are otherwise identical to the map 12 in FIG. 7*a*, but include a later-added point 18*j* or 18*k*, respectively. In FIG. 8, point 18*j* is inserted between points

18*d* and 18*h*. Point 18*j* is now adjacent to point 18*d* instead of point 18*h*. The connection data set associated with point 18*d* is modified to remove point 18*h* and to insert point 18*j* for the connection path 58 extending between points 18*d* and 18*j*. In FIG. 9, point 18*k* is an additional point adjacent to point 18*d*. Point 18*k* is added to the data connection set associated with point 18*d* for the connection path 58 extending between points 18*d* and 18*k*.

A visitor can also preferably edit the connection data set for a point 18 to add or subtract connection paths extending from the point. The visitor can add a remote point 18 to the data set, creating a connection path to that remote point. A point can be removed from the data set, eliminating a connection path. The modified data set can be stored on the visitor's machine 16 for use only by the visitor's browser 14, or the modifications can be saved in the network database 32 to be made available to all visitors.

A third type of path supported by the network 10 is the event path. An event path is a dynamic path generated by the network in response to an event or visitor query. For example, the visitor 39 may request the path from his or her current location to another location in the universe. The VR browser 14 queries the universe database 30 and displays the points 18 along the path on the map 12.

Figure 10:
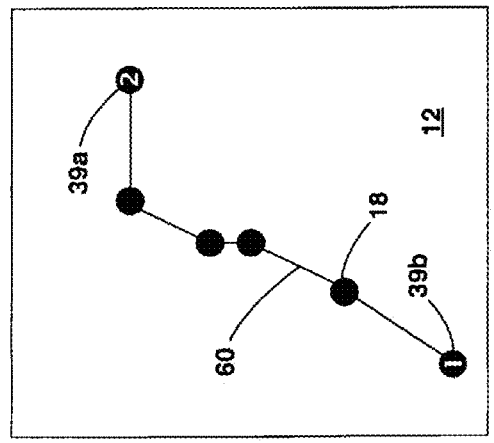

FIG. 10 illustrates an event path 60 generated by an event. The domain server 26 maintains a list of active visitors on the network 10 and the current location of each visitor in the universe. The map 12 displays the positions of all the visitors 39 and the path to each visitor. For clarity only two active visitors 39*a*, 39*b* and one path 60 between them are shown in FIG. 10. Paths 60 are automatically updated as visitors move about in the universe and as visitors join and leave the network.

A fourth type of path supported by the network is the visitor-defined path. Path 54 (see FIG. 5) represents a visitor-defined path. The visitor defines the end points and the points 18 of the path 54. The path can be created, for example, by inputting a list of the points 18 defining the path or by having the VR browser 14 maintain and store a history of the points 18 visited by the visitor in prior visits.

The definition of the visitor-defined path 54 may be stored on the visitor's machine 16 for use only by the visitor 39. Alternatively, the path definition is stored in the universe database 30 and made available to all network visitors.

As described above, the domain server 26 provides a single point of access for the VR browser 14 to initiate a visitor session and display a map of available points 18 in the universe. This enables new points 18 to be added to the universe and new virtual reality representations of new or existing points 18 to be made available to all VR browsers 14 on the network 10 by updating the domain server databases 30 and 32.

An author creating a virtual reality representation for a new or existing point 18 stores the data on his or her own VR data server 20 and then connects the VR data server to the network 10. The author remotely invokes an administrative program on the domain server 26 that adds the location to the universe database 30 and adds a new VRR record 34 to the network database 32. The new VRR record 34 includes the location of the new point 18 and the network address of the associated VR data server 20. The VR browser 14 automatically generates an up-to-date map 12 when it retrieves the map data from the universe database 30.

If desired, the client machine 16 can cache VR data 34 as well as records from the databases 30, 32, and 36 for improved performance. The VR browser 14 uses the local data cache to display the map and to retrieve VR data from the network 10. However, the data cache should be refreshed regularly or at the visitor's command to prevent stale data. Alternatively, the database records can include a "Time to Live" field for automatic updating of the data caches.

To facilitate creation of VR representations of points 18, the universe is preferably divided into a public region and a private region. Authors are free to add virtual reality representations of any point in the public region. Only authorized authors can add virtual representations of private regions.

To illustrate the concept of public and private regions in more concrete terms, the map 12 is a virtual representation of the Gettysburg National Military Park 62 and the adjacent borough of Gettysburg, Pa. 64. See FIG. 1; the borough of Gettysburg is represented schematically as a circular area. The Military Park 62 is a public region of the universe and the borough of Gettysburg 64 is a private region of the universe.

Tourists or Civil War buffs can author a virtual reality representation for a new point 18 in the Military Park 62 or author an additional virtual reality representation for an existing point 18. The author can provide visitor access to the representation through a publicly or privately available VR data server 20. The author updates the domain server databases 30, 32 through the administrative software as previously described and updates the local database 36 and stores the VR data 24 on the data server 20. The new point and its representation are now available to all visitors.

Over time, the number of points in the universe having virtual reality representations increases and the number of representations for a given point increases. This enables visitors to select points and view presentations that provide them with a rich and varied virtual visit to the virtual Military Park 62.

To further encourage the creation and selection of high-quality virtual presentations, each representation of a public point 18 is preferably assigned a quality moderation value. A quality moderation value represents the quality of the representation and assists visitors in selecting which representations to view. The quality moderation value is preferably stored in the representation's VRR record 34 (see FIG. 2) and is displayed on the map 12.

For example, a representation can be assigned a quality moderation value between 0 and 10, where 0 represents a low quality representation and 10 represents a high quality representation. A visitor can rate the quality of the representation after experiencing the virtual reality presentation. A running average of visitors' ratings is stored as the representation's quality moderation value. This mechanism enables the network 10 to be self-moderating in that representations whose quality falls below a minimum value can be automatically removed from the network or not listed for selection.

Virtual reality representations of points within Gettysburg borough 64, however, are limited to authorized authors. Examples of such authors may include owners of commercial establishments who wish to control the content of the virtual reality representation of their store or business. A private representation may be hosted on a VR data server 20 whose access is controlled by the author and may or may not be assigned a quality moderation value.

Virtual reality representations of public points are preferably created in a simple, standardized format to encourage those without technical or computer expertise to contribute virtual reality representations to the network 10.

Figure 11:
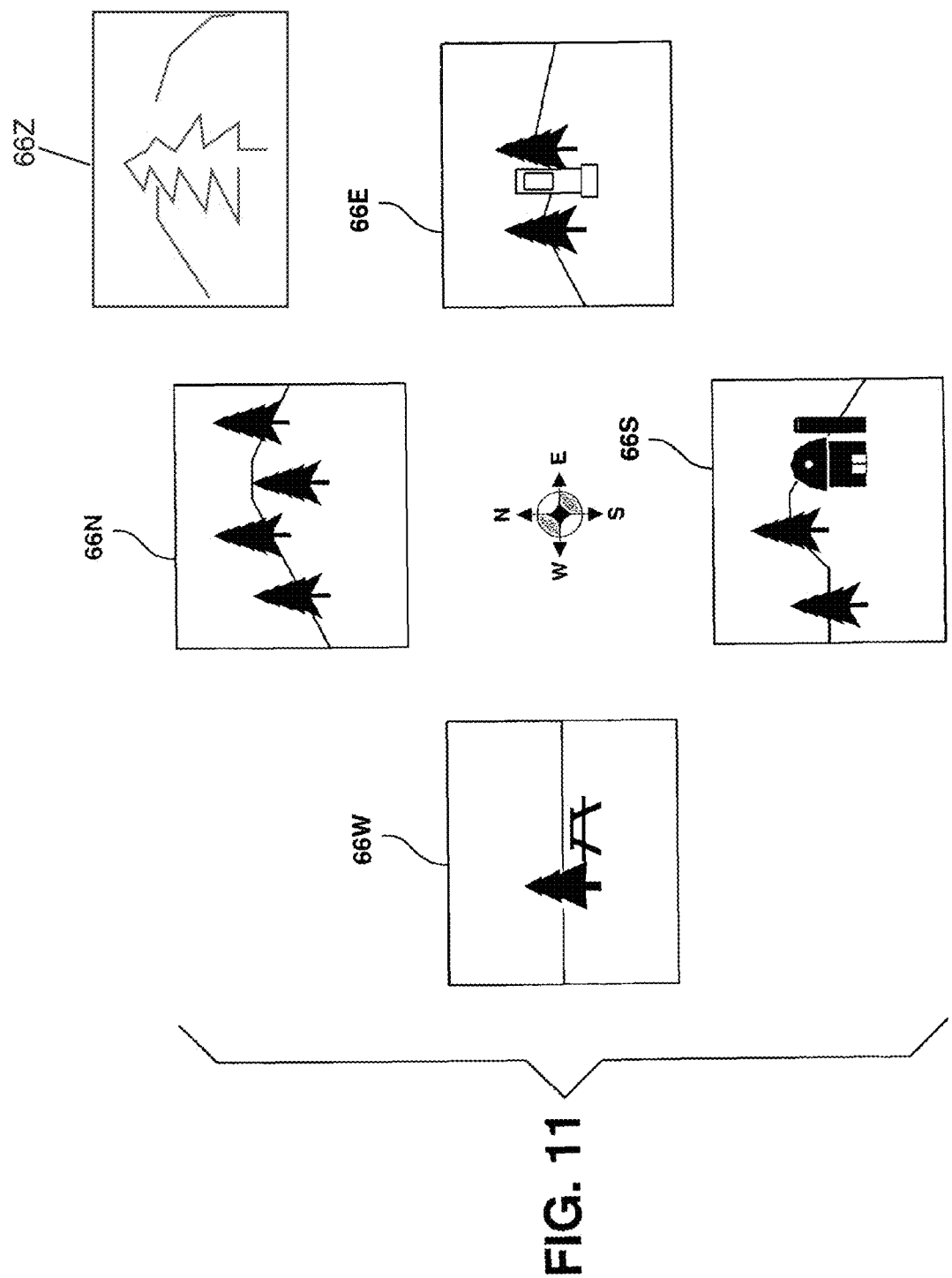
FIG. 11 represents photographs that define a simplified virtual reality representation of a physical location modeled in the virtual universe.

FIG. 11 illustrates a preferred, simplified virtual reality format. Four images 66 are taken with a digital camera from a point, each photograph having a line of view facing north, south, east, and west, respectively. The administrative program uploads the four image files and presents an on-line form requesting the location of the point and associated metadata. The administrative program stores the image files as VR data 24 on a VR data server 20, updates the universe database 30, adds the appropriate VRR record to the network database 32, and adds the appropriate VR record to the local database 36.

Because the illustrated public region 62 represents an area of the Earth, the latitude and longitude of the corresponding physical location of an actual point on the Earth's surface provides a convenient way of identifying the location of a point 18 on the map 12. The administrative program requests the latitude and longitude of the point, which can be obtained, for example, by a GPS reading when the digital photographs are taken.

It is understood that other kinds of metadata, data fields, data keys, or data formats can be used for or stored in the databases 30, 32, and 36 and that other VR data 24 can be stored in other file formats. The data can be distributed on other servers on the network 10. But the VR browser 14 preferably accesses the network 10 initially through the single domain server 26 regardless of how the data itself is distributed throughout the network 10.

FIG. 11. also shows image 66Z which is the downloaded data by the author from their communications with those individuals they connected with server 20A to the social media cloud 20E that share the same geolocation of the VR space. In this way, not only will the author be able to post many different images of their own experience of images 66W, 66N, 66S, 66E but also of third-party images 66Z. Thus, the VR data set is greatly enhanced by data from the crowd in the social media connections based upon geolocation.

It is contemplated that embodiments of the virtual reality network 10 will be customized for particular industries or visitors. For example, a real estate network would host virtual reality representations of houses available for sale. The seller's real estate agent takes photographs of each room in a house and uploads them to the real estate network, along with the floor plan and other metadata. A buyer's real estate agent selects the house to visit, and the VR browser displays the floor plan and the paths through the house. The visitor moves along the paths in the house, in effect taking a virtual reality tour through each room in the house.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While we have illustrated and described preferred embodiments of our invention, it is understood that this is capable of modification, and we therefore do not wish to be limited to the precise details set forth, but desire to avail ourselves of such changes and alterations as fall within the purview of the following claims.

What is claimed is:

1. A method for dynamic path generation in a virtual reality (VR) universe, the method comprising:
    storing a plurality of VR data sets at a VR server, each VR data set defining a VR representation of a location within a virtual universe;
    transferring one of the VR data sets associated with a selected location from the VR data server to a client device using a network address, wherein the client device generates a VR representation of the selected location based on the transferred VR data set;
    identifying that the transferred VR data set specifies one or more points associated with the selected location, wherein the points include a location of at least one visitor device within the virtual universe;
    dynamically defining one or more paths within the virtual universe, each path connecting the selected location to at least one of the points, the dynamically defined paths including a visitor path between the selected location and the location of the at least one visitor device in the virtual universe;
    providing a display of the defined paths including the visitor path within the virtual universe to the client device, wherein the at least one visitor device is identified at the location on the visitor path within the VR representation according to a search via a proxy server of a social media cloud in communication with at least one external social media site;
    establishing a real-time communication in the VR universe between the client device and the at least one identified visitor device using contact information from the at least one social media site; and
    touring together with the at least one identified visitor device to the selected location based on a selection by the client device.

2. The method of claim 1, wherein the points correspond to locations within the virtual universe, and further comprising generating a list of the locations corresponding to the points.

3. The method of claim 2, further comprising iteratively retrieving one or more VR data sets for one or more additional points as a user of the client device requests a move from the selected location to another selected location within the virtual universe.

4. The method of claim 3, further comprising dynamically updating the list of locations based on the move.

5. The method of claim 2, further comprising providing the list of locations to the client device for storage.

6. The method of claim 2, further comprising storing the list of locations at the VR server.

7. The method of claim 2, further comprising receiving a selection of a new location from the list of locations.

8. The method of claim 7, further comprising generating an updated VR representation based on a VR data set associated with a new location indicated by the selection.

9. The method of claim 1, further comprising removing one or more points from the VR data set associated with the selected location.

10. The method of claim 1, wherein the transferred VR data set includes a direction to one of the points from the selected location.

11. The method of claim 1, further comprising adding one or more points to the VR data set associated with the selected location.

12. A system for dynamic path generation in a virtual reality (VR) universe, the system comprising:
  memory that stores a plurality of VR data sets, each VR data set defining a VR representation of a location within a virtual universe;
  a communication interface that transfers one of the VR data sets associated with a selected location to a client device using a network address, wherein the client device generates a VR representation of the selected location based on the transferred VR data set; and
  a processor that executes instructions stored in memory, wherein the processor executes the instructions to:
    identify that the transferred VR data set specifies one or more points associated with the selected location, wherein the points include a location of at least one visitor device within the virtual universe; and
    dynamically define one or more paths within the virtual universe, each path connecting the selected location to at least one of the points, the dynamically defined paths including a visitor path between the selected location and the location of the at least one visitor device in the virtual universe;
  wherein the communication interface:
    provides a display of the defined paths including the visitor path within the virtual universe to the client device, wherein the at least one visitor device is identified at the location on the visitor path within the VR representation according to a search via a proxy server of a social media cloud in communication with at least one external social media site;
    establishing a real-time communication in the VR universe between the client device and the at least one identified visitor device using contact information from the social media site; and
    touring together with the at least one identified visitor device to the selected location based on a selection by the client device.

13. The system of claim 12, wherein the points correspond to locations within the virtual universe, and wherein the VR server further generates a list of the locations corresponding to the points.

14. The system of claim 13, wherein the processor executes further instructions to iteratively retrieve one or more VR data sets for one or more additional points as a user of the client device requests a move from the selected location to another selected location within the virtual universe.

15. The system of claim 14, wherein the processor executes further instructions to dynamically update the list of locations based on the move.

16. The system of claim 13, wherein the communication interface provides the list of locations to the client device for storage.

17. The system of claim 13, wherein the memory further stores the list of locations.

18. The system of claim 13, wherein the communication interface further receives a selection of a new location from the list of locations.

19. The system of claim 18, wherein the processor executes further instructions to generate an updated VR representation based on a VR data set associated with a new location indicated by the selection.

20. The system of claim 12, wherein the processor executes further instructions to add or remove one or more points from the VR data set associated with the selected location.

21. The system of claim 12, wherein the transferred VR data set includes a direction to one of the points from the selected location.

22. A non-transitory computer-readable storage medium having embodied thereon a program executable by a processor to perform a method for dynamic path generation in a virtual reality (VR) universe, the method comprising:
  storing a plurality of VR data sets at a VR server, each VR data set defining a VR representation of a location within a virtual universe;
  transferring one of the VR data sets associated with a selected location from the VR data server to a client device using a network address, wherein the client device generates a VR representation of the selected location based on the transferred VR data set;
  identifying that the transferred VR data set specifies one or more points associated with the selected location, wherein the points include a location of at least one visitor device within the virtual universe;
  dynamically defining one or more paths within the virtual universe, each path connecting the selected location to at least one of the points, the dynamically defined paths including a visitor path between the selected location and the location of the at least one visitor device in the virtual universe;
  providing a display of the defined paths including the visitor path within the virtual universe to the client device, wherein the at least one visitor device is identified at the location on the visitor path within the VR representation according to a search via a proxy server of a social media cloud in communication with at least one external social media site;
  establishing a real-time communication in the VR universe between the client device and the at least one identified visitor device using contact information from the social media site; and
  touring together with the at least one identified visitor device to the selected location based on a selection by the client device.

* * * * *